(12) United States Patent
Latham

(10) Patent No.: US 9,796,942 B2
(45) Date of Patent: Oct. 24, 2017

(54) BEARING MATERIAL

(71) Applicants: Mahle International GmbH, Stuttgart (DE); Mahle Engine Systems UK Ltd, Warwickshire (GB)

(72) Inventor: David Latham, Shropshire (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 29 days.

(21) Appl. No.: 14/872,820

(22) Filed: Oct. 1, 2015

(65) Prior Publication Data

US 2016/0097015 A1   Apr. 7, 2016

(30) Foreign Application Priority Data

Oct. 2, 2014  (GB) .................................. 1417464.3

(51) Int. Cl.
```
F16C 33/20      (2006.01)
C10M 107/50     (2006.01)
C08G 73/14      (2006.01)
C08G 73/18      (2006.01)
C08G 77/26      (2006.01)
C08G 73/10      (2006.01)
```

(52) U.S. Cl.
CPC ......... C10M 107/50 (2013.01); C08G 73/106 (2013.01); C08G 73/14 (2013.01); C08G 73/18 (2013.01); C08G 77/26 (2013.01); F16C 33/201 (2013.01); F16C 33/206 (2013.01); *F16C 2202/04* (2013.01); *F16C 2204/10* (2013.01); *F16C 2204/20* (2013.01); *F16C 2208/22* (2013.01); *F16C 2208/32* (2013.01); *F16C 2208/42* (2013.01); *F16C 2208/44* (2013.01); *F16C 2208/58* (2013.01)

(58) Field of Classification Search
CPC . F16C 33/201; F16C 2208/42; F16C 2208/44
USPC .................................................. 508/100–109
See application file for complete search history.

(56) References Cited

U.S. PATENT DOCUMENTS

| 4,391,951 A |   | 7/1983 | Scheetz |   |
|---|---|---|---|---|
| 5,750,620 A | * | 5/1998 | Davies | .................... C08L 23/02 |
|  |  |  |  | 508/100 |

(Continued)

FOREIGN PATENT DOCUMENTS

| JP | H1060112 A | 3/1998 |
| JP | 2002020893 A | 1/2002 |

(Continued)

OTHER PUBLICATIONS

English Abstract for JP2002020893A.
English Abstract for JPH1060112A.

*Primary Examiner* — Ellen McAvoy
(74) *Attorney, Agent, or Firm* — Fishman Stewart PLLC

(57) ABSTRACT

A plastic bearing material of a bearing may include a block copolymer. The block copolymer may include structural blocks of two or more different polymers. A first polymer may include at least one of polyamide-imide and polybenzimidazole. A second polymer may include at least one of polydimethylsiloxane, methyl vinyl ether and polyisobutene. A method for manufacturing a plastic bearing material may include synthesizing a structural block of a first polymer and a structural block of a second polymer to define a block copolymer via a condensation reaction.

20 Claims, 2 Drawing Sheets

(56) References Cited

U.S. PATENT DOCUMENTS

| | | | |
|---|---|---|---|
| 7,942,581 B2* | 5/2011 | Leonardelli | B05D 5/08 |
| | | | 384/129 |
| 8,048,526 B2* | 11/2011 | Mizrahi | C10M 125/04 |
| | | | 427/214 |
| 9,109,185 B2* | 8/2015 | Tomikawa | C10M 169/04 |
| 9,121,442 B2* | 9/2015 | Stern | F16C 17/04 |
| 9,303,230 B2* | 4/2016 | Tomikawa | C10M 169/04 |
| 9,371,498 B2* | 6/2016 | Bongaerts | B01J 20/24 |
| 2004/0008914 A1 | 1/2004 | Hiramatsu et al. | |
| 2010/0316315 A1* | 12/2010 | Shimazu | F16C 33/44 |
| | | | 384/445 |
| 2012/0101011 A1* | 4/2012 | Makino | C10M 125/00 |
| | | | 508/100 |
| 2015/0307806 A1* | 10/2015 | Sasaki | B60J 10/17 |
| | | | 508/107 |
| 2016/0264778 A1* | 9/2016 | Masunaga | C08L 77/02 |

FOREIGN PATENT DOCUMENTS

| | | |
|---|---|---|
| WO | WO-2004/113749 A1 | 12/2004 |
| WO | WO-2009085809 A1 | 7/2009 |
| WO | WO-2009085929 A1 | 7/2009 |
| WO | WO-2010/066396 A1 | 6/2010 |

\* cited by examiner

BEARING MATERIAL

CROSS-REFERENCE TO RELATED APPLICATIONS

This application claims priority to British Patent Application No. 1417464.3, filed Oct. 2, 2014, the contents of which are hereby incorporated by reference in their entirety.

TECHNICAL FIELD

The present invention relates to a bearing material for plain bearings, and in particular to a plastics bearing material for use in forming a running surface or sliding surface of a plain bearing.

BACKGROUND

Plain bearings for use as crankshaft journal bearings in internal combustion engines, for example, are usually semi-cylindrical in form and generally have a layered construction. The layered construction frequently comprises; a backing made from a strong backing material such as steel, of a thickness in the region of about 1 mm or more; a lining of a first bearing material adhered to the backing and of a thickness generally in the range from about 0.1 to 0.5 mm; and a layer of a second bearing material adhered to the surface of the first bearing material and having a thickness of less than about 40 µm. The surface of the second bearing material forms the actual running or sliding surface with a co-operating shaft journal surface.

The backing provides strength and resistance to deformation of the bearing shell when it is installed in a main bearing housing or in a connecting-rod big end, for example.

The first bearing material layer may provide suitable bearing running properties if the layer of the second bearing material should be worn through for any reason, and prevent the journal surface from coming into contact with the strong backing material. It also bonds to the backing, and supports and bonds to the second bearing material. The first bearing material may commonly be either an aluminium-based alloy or a copper-based alloy. Copper-based alloys, such as bronzes, are typically used in more highly-loaded bearings to provide additional support for the second bearing material layer.

The second bearing material layer which co-operates with the shaft journal may also be termed an overlay, or overlay layer. Conventionally, this has generally been formed by a relatively soft metal layer, such as an electrochemically-deposited tin-lead alloy or a sputtered aluminium-tin alloy. A relatively soft overlay is used in order to provide conformability (the ability of the bearing to accommodate small misalignments between the bearing surface and the shaft journal) and embedability (the ability to prevent debris, or dirt particles, which may circulate in the lubricating oil, from scoring or damaging the journal surface by enabling such debris to embed in the bearing surface).

More recently, bearing overlay layers comprising a matrix of plastics polymer material have been used. Examples are described in WO 2004/113749 and WO 2010/066396. Such overlay materials are commonly based on a matrix of polyamide-imide (PAI) containing various filler materials, such as hard reinforcing particles, soft particles of solid lubricant materials, and other components such as metal particles. Hard reinforcing particles may include ceramic or metal oxide particles. Solid lubricants may include materials such as fluoropolymers, e.g. PTFE. Metal particles may include aluminium particles, such as aluminium flakes.

Plastics polymer bearing overlays have provided high-strength, low-friction bearings having a desirably long service life, but a problem arises in that the embedability performance of such polymer bearing overlays may be less good than conventional metallic bearing overlays, such as electrodeposited overlays. In addition there is an increasing demand for good embedability as longer service intervals are demanded for internal combustion engines.

Softer plastics materials have not provided adequate wear resistance for use as bearing overlay materials. They have been used on top of conventional metal bearing materials to provide a so-called "bedding-in" layer, or sacrificial overlay, intended to facilitate initial running-in and provide conformability, but these layers wear away over time and leave the conventional metallic bearing lining as the long-term running or sliding surface. Such polymer bedding-in layers have relatively high contents of filler materials generally comprising self-lubricating materials such as graphite, molybdenum disulphide and the like. These high filler contents of inherently weak materials are detrimental to strength and wear resistance of the bearing layer which wears away relatively rapidly to fulfill the function of a bedding-in layer. Since the layer is intended to wear away relatively rapidly it is generally quite thin at about 5 µm or less.

SUMMARY

An object of the invention is to provide a plastics bearing material to form a bearing overlay layer having a desirably long service life and enhanced embedability.

The invention provides a plastics bearing material, a bearing, and methods for making a plastics bearing material and a bearing, as defined in the appended independent claims, to which reference should now be made. Preferred or advantageous features of the invention are set out in dependent subclaims.

In a preferred embodiment, the invention may thus provide a plastics bearing material comprising a copolymer, such as a block copolymer. The copolymer may comprise two or more different polymers, or polymerised monomers, preferably in the form of blocks covalently bonded together to form a block copolymer. The plastics bearing material may be used to form an overlay for a plain bearing, optionally as a matrix material incorporating other materials such as metal particles, solid lubricants and/or other materials to modify the properties of the overlay.

The bearing material may be suitable for use in sliding engine components, for example, for sliding bearing assemblies such as bearing lining shells, bushes, bearing surfaces of crankshafts, bearing surfaces of connecting rods, thrust washers, bearing surfaces of a bearing block, bearing surfaces of a bearing cap, and piston assembly components such as piston rings, piston skirts, and cylinder walls and cylinder liners.

The copolymer may comprise first and second polymers, and may comprise more than two polymers. The first polymer may for example comprise polyamide-imide (PAI) or polybenzimidazole (PBI), or other known plastics polymer bearing materials such as epoxy resins, phenolic resins or polyether ether ketones (PEEKs). The second polymer may for example comprise polydimethoxysilane (PDMS), methyl vinyl ether (MVE) or polyisobutene.

In principle, it is the inventor's current understanding that it may be desirable to form the copolymer from blocks of polymers, or polymerised monomers, that respectively provide desired properties of the plastics bearing material. For example a first polymer, such as in the examples set out above, may be sufficiently hard and wear resistant to function as a bearing material, but may not provide a desired level of embedability. A second polymer, such as in the examples set out above, may be softer, or less hard, or less rigid, than the first polymer and may thus provide the desired embedability.

Preferably, in the plastics bearing material the first and second polymers may align to form spatially-localised domains having physical properties of the first and second polymers respectively. The material may thus comprise physically-localised regions of harder material, providing wear resistance, and regions of softer, or more elastic, material, providing embedability. And because the first and second polymers are covalently bonded together to form the copolymer, the plastics bearing material may advantageously provide a high fatigue strength and load-carrying capability.

In a preferred embodiment, the proportions of the polymers forming the copolymer are selected according to the desired bearing material properties. For example, the copolymer may comprise at least 50 wt % of the first polymer, and/or the copolymer may comprise more than 5 wt % or 10 wt % or 15 wt % of the second polymer, and/or less than 50 wt % or 40 wt % or 30 wt % of the second polymer. These proportions of the first and second polymers may be applicable for materials listed as examples above, such as PAI and PDMS.

In a further aspect of the invention the molecular weight of the first, second and any other polymers forming the copolymer may be selected to provide desired properties.

In a copolymer, such as a block copolymer (or co-network polymer), blocks of two or more polymers, or polymerised monomers, may be covalently bonded to form a copolymer macromolecule. For example blocks of two polymers A and B may be bonded in a predetermined sequence such as "-ABABAB-" to form the copolymer molecule. More complex sequences, or sequences involving three or more polymers such as "-ABCABC-", may also be used. The sizes of the polymer blocks may be quantified in terms of their relative molecular mass, or relative molecular weight.

In preferred embodiments, the block size of the second polymer may be greater than 500 or 1000 Daltons (equivalent to g·mol$^{-1}$), and/or less than 3000 or 4000 Da. This molecular weight may apply in particular to the second polymer examples mentioned above, such as PDMS. The block size (molecular weight) of the first polymer may be in the same range as for the second polymer, but is preferably greater, such as more than 2 or 3 or 4 times greater, and/or less than 5 or 10 times greater. This may apply in particular to the first polymer examples mentioned above, such as PAI.

Thus, for example, the ratio of the molecular weight of blocks of the first polymer to the molecular weight of blocks of the second polymer may be more than 1:1, preferably more than 2:1 and particularly preferably more than 3:1. A desirable ratio may be about 4:1. (All of these ratios may be varied within +/−10% or +/−5%.)

Experiments have found that control of the molecular weights of the blocks of the polymers may advantageously vary the sizes of the physically-localised domains in the plastics bearing material exhibiting properties of the first and second and any other polymers in the copolymer material. For example increasing the molecular weight of the blocks of a second, softer, polymer may increase the sizes of softer regions, or domains, of the plastics bearing material in which debris may embed.

Increasing the ratio, or weight percent, of the first, harder, polymer may increase the proportion, or quantity, of harder regions, or domains, of the plastics bearing material and increase its wear resistance. Increasing the weight percent of the second polymer may increase the proportion, or quantity, of softer regions, or domains.

In embodiments of the invention, the molecular weights of each block of a respective polymer in a copolymer may not all be equal. In that case the references above to the relative molecular weights of the respective types of polymer blocks (i.e. first polymer, second polymer, third polymer and so on) should be taken to refer to the average relative molecular weights of each type of polymer in the plastics bearing material.

Plastics bearing materials embodying the invention may advantageously be usable in the same ways and in the same applications as existing plastics bearing materials or overlays. Thus for example the plastics bearing materials may be applied over metal substrates, such as aluminium-based alloy interlayers or copper-based alloy interlayers supported by steel backing materials, or they may be applied directly to steel backings, or to any other suitable substrates. They may be applied using conventional techniques such as spraying and/or curing.

BRIEF DESCRIPTION OF THE DRAWINGS

Specific embodiments of the invention will now be described by way of example, with reference to the accompanying drawings, in which.

DETAILED DESCRIPTION

Figure 1:
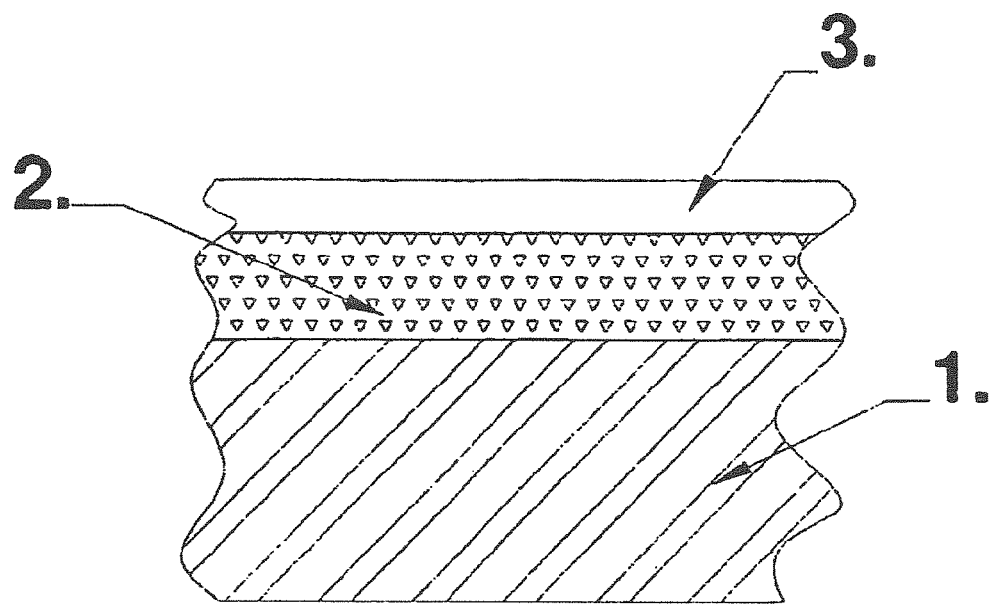
FIG. 1 is a cross-section of a plain bearing.

FIG. 1 shows a cross section through a half shell of a cylindrical sliding bearing comprising a strong backing 1 of steel, a bearing lining layer 2 of a copper-based alloy or an aluminium-based alloy bonded to the backing, and a plastics, polymer-based overlay layer 3 embodying the present invention bonded to the lining layer. In other embodiments of the invention the overlay may be bonded directly to the backing, and the lining layer omitted, depending on the compatibility of the materials used and the intended use of the bearing.

A conventional plastics bearing overlay may utilise, for example, a polyamide-imide (PAI) resin matrix containing aluminium flakes and PTFE particles, and provide good fatigue and wear performance. To produce an overlay with enhanced embedability, embodiments of the invention may replace the resin matrix of the conventional overlay with a modified resin comprising a block copolymer of PAI with a softer polymer such as polydimethylsiloxane (PDMS). PDMS is soft for good embedment whilst also having stability at temperatures suitably in excess of those seen in internal-combustion-engine applications.

Figure 2:
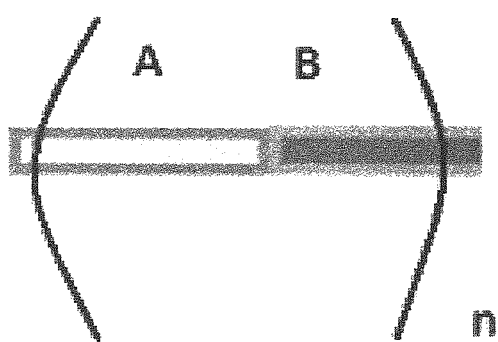
FIG. 2 illustrates a block copolymer structure.

A block co-polymer (or co-network polymer) is one where the polymer chains may consist of alternating segments of two or more different polymers. In the case of PAI and PDMS, a condensation reaction may be used to form the copolymer. FIG. 2 schematically illustrates the repeat unit of this copolymer. Each repeat unit comprises a segment or block (A) of PAI and a segment or block (B) of PDMS. The lengths of the A and B segments can be controlled by varying the molecular weights (Mw) of A and B. The molecular weights and the pattern of incorporation of each polymer into the copolymer may determine the weight percentage of each polymer in the copolymer.

in the inventors' experiments, PDMS has been copolymerised with PAI in the range 10-30 wt % and the effect of block size investigated, using PDMS of 1000 and 3000 Da. Initial results indicate that the copolymer comprising PDMS of 3000 Da shows better embedability than the copolymer comprising PDMS of 1000 Da.

Due to the two polymers being chemically bound to each other in the chain structure of the copolymer molecule, there is a reduced risk of failure by fatigue (i.e. there is no separate phase to act as a stress raiser, as there would be if a softer polymer were present as a separate phase or a separate molecule in a PAI matrix).

As the copolymer solidifies, for example on evaporation of a solvent carrying the copolymer, the A and B phases tend to repel and move away from each other. The polymer chains contort and line up so that A segments align with other A segments and B segments align with other B segments. This leads to the creation of physically-localised domains within the polymer matrix. These may be very small nanometer-scale domains. Due to surface energy differences between the polymers, one species (A or B domains) may be slightly raised at the surface. In the case of PAI and PDMS, the PDMS creates nano-scale soft 'islands' on the surface of the coating. This may advantageously help with friction reduction and initial running-in.

Other soft segments may be used instead of, or in combination with, PDMS such as Methyl Vinyl Ether (MVE) and Polyisobutene.

EXAMPLES

In specific Examples of the invention, two samples of block copolymers comprising polyamide-imide and PDMS segments were synthesised. The samples were characterised by DMF GPC (Dimethylformamide Gel Permeation Chromatography), Solid State NMR (Nuclear Magnetic Resonance) and TGA (Thermal Gravimetric Analysis), as described further below.

Synthesis Method and Formulations

TABLE 1

Summary of materials employed in the synthesis of polyamide-imide block copolymer containing PDMS soft segments. All materials were used as received without further purification.

| Reagent | CAS* |
|---|---|
| N-methyl pyrrolidone (NMP) | 872-50-4 |
| Tetrahydrofuran (THF) | 109-99-9 |
| 4,4'-Methylenedianiline 97% (DMA) | 101-77-9 |
| Triphenyl Phosphite 97% (TPP) | 101-02-0 |
| Pyridine (Py) | 110-86-1 |
| LiCl | 7447-41-8 |
| Calcium Chloride ($CaCl_2$) | 10043-52-4 |
| Trimellitic Anhydride Chloride (TMA) | 1204-28-0 |
| Aminopropyl terminated polysiloxane (3000 g · $mol^{-1}$) PDMS | 106214-84-0 |
| Aminopropyl terminated polysiloxane (1000 g · $mol^{-1}$) PDMS | 106214-84-0 |

*Chemistry Abstracts Service (CAS) Registry number.

TABLE 2

Table summarises the formulations used to prepare batches of polyamide-imide block copolymer containing PDMS soft segments.

| | Batch | |
|---|---|---|
| Reagent | 8/4/14 | 23/4/14 |
| TMA Chloride (g) | 16.90 | 17.14 |
| NMP (ml) | 40 | 50 |
| PDMS diamine (g/mmol) | 8.0 | 8.0 |
| PDMS molecular weight (g · $mol^{-1}$) | 1000 | 3000 |
| THF (ml) | 40 | 40 |
| DMA (g) | 15.86 | 15.86 |
| NMP (ml) | 40 | 40 |
| Pyridine (ml) | 20 | 20 |
| TTP (g) | 26 | 26 |
| LiCl (g) | 2 | 2 |
| $CaCl_2$ (g) | 4 | 4 |

Trimellitic anhydride chloride (TMA Cl) was dissolved in N-methylpyrrolidone (NMP) using overhead mechanical stirring at ambient temperature under a constant dry nitrogen stream, typically requiring up to 20 minutes.

A solution of Aminopropyl terminated polysiloxane (PDMS) of the required molecular weight in tetrahydrofuran (THF) was then added drop-wise to the stirred TMA Cl solution at room temperature under $N_2$ and stirred for 30 minutes. THF was required to solubilise the PDMS.

While still at ambient temperature a solution of 4,4'-methylene dianilene (DMA) in NMP was added with the reaction still under a constant $N_2$ stream, addition time typically being 20-30 minutes.

After the addition of DMA the reaction was heated to around 100-120° C. and evacuated for 2-3 hours to remove THF added during the PDMS diamine addition. During this heating stage an increase in viscosity was noted.

After the heating stage the TPP and Pyridine catalysts were added along with the LiCl and CaCl; these were typically added one after the other in the order given with no time gaps.

After the last addition the reactor was again heated and maintained at 120° C. for approximately 2-3 hours.

Polymer product was isolated by initially precipitating the contents of the reactor into a large quantity (10-15 reactor volumes) of deionised water with good stirring drop-wise at room temperature. The resultant solid was collected by filtration and then either dried under vacuum or reslurried in acetone and refiltered in order to remove most of any trapped water prior to continuing the purification stage.

Resultant solid polymer at this stage was further purified by redissolution in NMP and reprecipitation into a larger volume (typically 1-2 litres) of either methanol or acetone before filtering and drying to constant weight.

Sample solutions were then prepared by dissolving a known mass of dry polymer in a known volume of NMP at 120° C. with stirring until a homogenous solution was formed (other solvents such as NEP may be used).

Results

Table 3 sets out data characterising the two copolymers, compared with a known material Rhodeftal 210ES which is a PAI resin.

TABLE 3

| Batch | $M_n$ (g·mol⁻¹) a | $M_w$ (g·mol⁻¹) a | PD d | PDMS block $M_w$ (g·mol⁻¹) | PDMS Inclusion (wt %) b | Onset of decomposition c | Concentration (% w/w NMP) |
|---|---|---|---|---|---|---|---|
| 8/4/14 | 33,000 | 64,000 | 1.94 | 1,000 | ~15 | 431° C. | 40 |
| 23/4/14 | 40,700 | 145,600 | 3.58 | 3,000 | ~19 | 461° C. | 25 |
| Rhodeftal 210ES | 13,300 | 30,700 | 2.31 | 0 | 0 | 437° C. | — | a These molecular weights were determined by DMF GPC and are quoted as polymethylmethacrylate-equivalent molecular weights.
b The quantity of inclusion of PDMS as a weight percentage in the PAI-PDMS copolymer was determined by solid state NMR employing PDMS calibrants dispersed on polyethylene powder. Error approximately ± 20%.
c Onset temperature of decomposition was determined by TGA analysis
d Polydispersity (PD), which is $M_w/M_n$.

DMF GPC Analysis

Samples were made up at approximately 5 mg/ml in DMF and analysed using a Varian 290LC employing DMF as the eluent and two Agilent PL Gel 5 μm Mixed C columns operating in series. The flow rate was 1ml/min and the temperature of the columns was 60° C.

The system was calibrated with near-monodisperse polymethyl methacrylate standards.

This analysis generated the molecular weight $M_n$ and $M_w$ and PD data in Table 3 above.

Solid State NMR Analysis

To correlate the signal intensity to the absolute amount of siloxane in the polymers, three spectra from a "standard" sample of Aminopropyl terminated polysiloxane (3000 gmol-1) were generated. These were made up from a known mass of the pure Aminopropyl terminated polysiloxane dispersed into a rotor (sample container) containing powdered polyethylene. This gave a calibration plot of signal response per mass of siloxane. The results are shown in Table 4 below.

TABLE 4

| Batch | Total mass of material (mg) | Mass of PDMS (mg) | PDMS content wt % |
|---|---|---|---|
| 8/4/14 | 101 | 15 | ~15 |
| 23/4/14 | 99 | 19 | ~19 |
| Rhodeftal 210ES | 143 | 0 | 0 |

TGA Analysis

Samples were analysed using a Perkin Elmer Pyris 1 TGA instrument to assess whether copolymerisation with PDMS had adversely affected the high thermal stability of the PAI, which is desirable in a bearing overlay. The temperature of onset of thermal degradation for the Rhodeftal 210ES as measured was 437° C. The corresponding temperatures for batches 8/4/14 and 23/4/14 were 413° C. and 461° C. In addition, the imidisation temperatures for the Rhodeftal 210ES and the two batches were all the same, at 200-250° C. These results indicate that the copolymers advantageously retained the thermal stability of the PAI.

AFM Analysis

AFM (Atomic Force Microscopy) analysis of spray-cast and cured films of sample 8/4/14 indicated that phase separation of the PDMS blocks in the PA matrix, to form physically-localised domains, occurs as expected.

Figure 3:
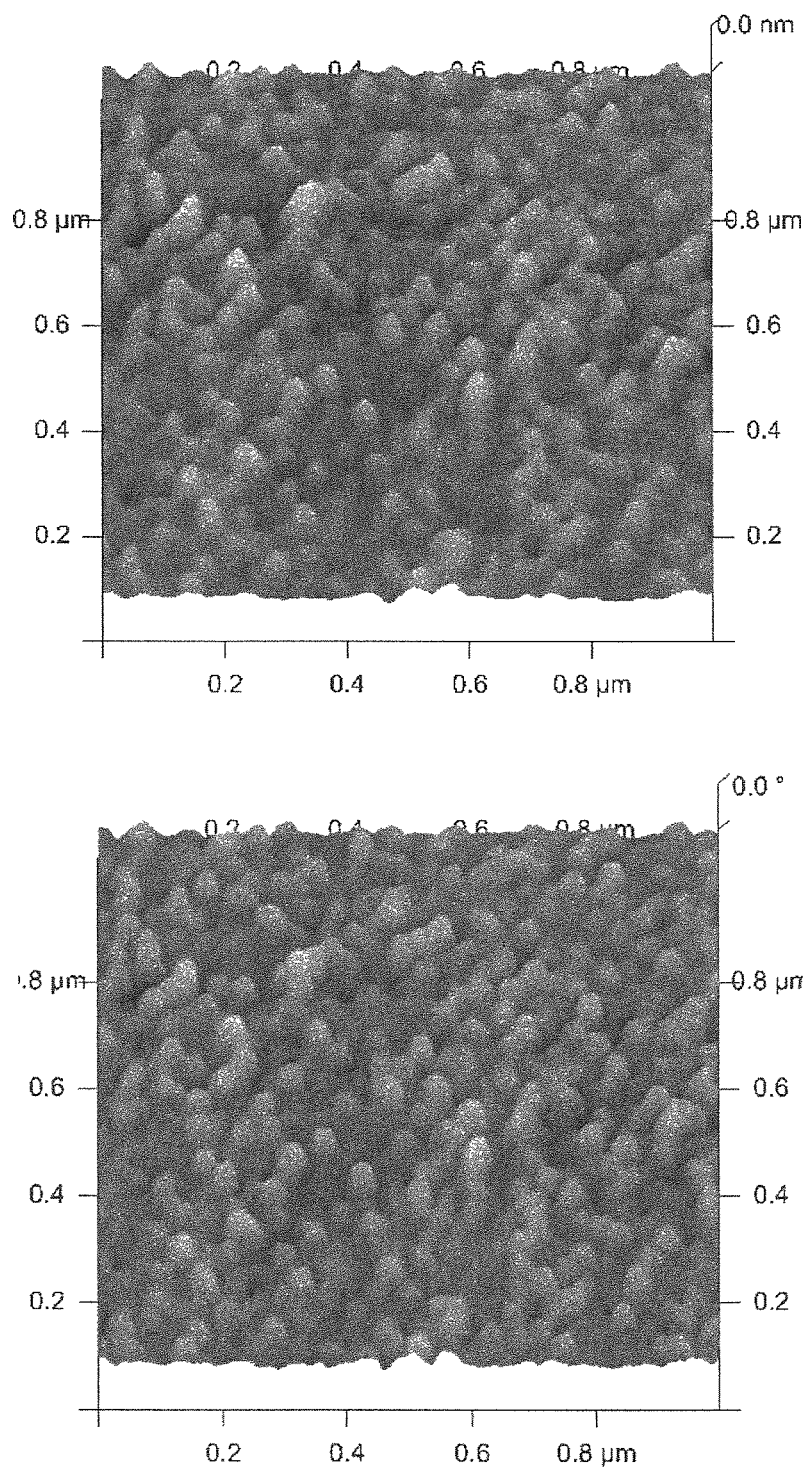
FIG. 3 shows tapping-mode atomic-force microscopy (AFM) images of hard and soft domains in a plastics bearing material embodying the invention.

Tapping mode AFM was used to obtain information on the height and phase of the surface of sample 8/4/14. FIG. 3 shows tapping mode AFM images of height and phase differences, indicating spatial separation of hard and soft copolymer domains on the bearing material surface. The light contrast in the images indicates raised areas, or domains, of the sample surface, which correspond to softer domains of the copolymer.

The invention claimed is:

1. A plastics bearing material, comprising:
   a block copolymer including structural blocks of two or more different polymers;
   wherein the structural block of a first polymer includes at least one of polyamide-imide and polybenzimidazole.

2. A plastics bearing material according to claim 1, wherein the first polymer is polyamide-imide.

3. A plastics bearing material according to claim 1, wherein the first polymer is polybenzimidazole.

4. A plastics bearing material according to claim 1, wherein the structural block of a second polymer includes a polymer having a lower hardness than the first polymer.

5. A plastics bearing material according to claim 1, wherein the structural block of a second polymer includes at least one of polydimethylsiloxane, methyl vinyl ether and polyisobutene.

6. A plastics bearing material according to claim 4, wherein the block copolymer contains more than one of 5 wt %, 10 wt % and 15 wt % of the second polymer.

7. A plastics bearing material according to claim 4, wherein the block copolymer contains less than one of 50 wt %, 40 wt % and 30 wt % of the second polymer.

8. A plastics bearing material according to claim 4, wherein the structural block of the second polymer has a molecular weight greater than one of 500Da, 1000Da, 1500Da, 2000Da, and 2500Da.

9. A plastics bearing material according to claim 4, wherein the structural block of the second polymer has a molecular weight less than one of 1500Da, 2000Da, 2500Da, 3000Da, 3500Da and 4000Da.

10. A plastics bearing material according to claim 4, wherein the structural block of the second polymer has an average molecular weight greater than one of 500Da, 1000Da, 1500Da, 2000Da and 2500Da.

11. A plastics bearing material according to claim 4, wherein the structural block of the second polymer has an average molecular weight less than one of 1500Da, 2000Da, 2500Da, 3000Da, 3500Da and 4000Da.

12. A plastics bearing material according to claim 1, wherein the block copolymer includes structural blocks wherein the block copolymer includes structural of two or more different copolymers that each form a domain within the bearing material.

13. A plastics bearing material according to claim 1, wherein the block copolymer includes a matrix and at least one material is distributed throughout the matrix selected from a metal powder, a fluoropolymer, a silane and a solid lubricant.

14. A plastics bearing material according to claim 13, wherein the metal powder includes aluminium in the form of flakes.

15. A bearing comprising: a plastics bearing material including a block copolymer, the block copolymer including a first structural block of a first polymer and a second structural block of a second polymer;
wherein the first polymer includes at least one of polyamide-imide and polybenzimidazole, and the second polymer includes a polymer having a lower hardness than the first polymer.

16. A method for manufacturing a plastics bearing material, comprising:
providing a first structural block of a first polymer, the first polymer including at least one of polyamide-imide and polybenzimidazole;
providing a second structural block of a second polymer, the second polymer including a polymer having a lower hardness than the first polymer; and
synthesising the first structural block with the second structural block to define a block copolymer via a condensation reaction.

17. A method according to claim 16, wherein the second polymer includes at least one of polydimethylsiloxane, methyl vinyl ether and polyisobutene.

18. A bearing according to claim 15, wherein the second polymer includes at least one of polydimethylsiloxane, methyl vinyl ether and polyisobutene.

19. A bearing according to claim 15, wherein block copolymer includes between 10 wt % to 50 wt % of the second copolymer.

20. A plastics bearing material comprising:
a block copolymer including structural blocks of two or more different polymers;
wherein the structural block of one of the two or more different polymers includes at least one of polydimethylsiloxane, methyl vinyl ether and polyisobutene.

* * * * *